US011382121B2

(12) United States Patent
Marinier et al.

(10) Patent No.: US 11,382,121 B2
(45) Date of Patent: Jul. 5, 2022

(54) RELIABLE CONTROL SIGNALING

(71) Applicant: IDAC Holdings, Inc., Wilmington, DE (US)

(72) Inventors: Paul Marinier, Brossard (CA); J. Patrick Tooher, Montreal (CA); Tao Deng, Roslyn, NY (US); Ghyslain Pelletier, Montreal (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/621,129

(22) PCT Filed: Jun. 11, 2018

(86) PCT No.: PCT/US2018/036967
§ 371 (c)(1),
(2) Date: Dec. 10, 2019

(87) PCT Pub. No.: WO2018/231728
PCT Pub. Date: Dec. 20, 2018

(65) Prior Publication Data
US 2020/0196343 A1 Jun. 18, 2020

Related U.S. Application Data

(60) Provisional application No. 62/667,015, filed on May 4, 2018, provisional application No. 62/652,002, filed (Continued)

(51) Int. Cl.
*H04W 72/12* (2009.01)
*H04L 5/00* (2006.01)

(52) U.S. Cl.
CPC ......... *H04W 72/1284* (2013.01); *H04L 5/001* (2013.01); *H04L 5/0053* (2013.01); *H04L 5/0092* (2013.01); *H04W 72/1289* (2013.01)

(58) Field of Classification Search
CPC .......... H04W 72/1284; H04W 72/1289; H04L 5/001; H04L 5/0053; H04L 5/0092; H04L 1/1854
See application file for complete search history.

(56) References Cited

U.S. PATENT DOCUMENTS 9,603,099 B2  3/2017 Shin et al.
2010/0041430 A1* 2/2010 Ishii ................ H04W 52/04
                                                    455/522
(Continued)

FOREIGN PATENT DOCUMENTS

EP      3413637 A1    12/2018
JP    2012-005034 A    1/2012
(Continued)

OTHER PUBLICATIONS

3rd Generation Partnership Project (3GPP), R1-1701595, "Analysis of URLLC Reliability for HARQ", ZTE, ZTE Microelectronics, 3GPP TSG RAN WG1 Meeting #88, Athens, Greece, Feb. 13-17, 2017, pp. 1-15.
(Continued)

*Primary Examiner* — Jael M Ulysse
(74) *Attorney, Agent, or Firm* — Flaster Greenberg, P.C.

(57) ABSTRACT

Systems, methods, and instrumentalities are disclosed for reliable control signaling, for example, in New Radio (NR). A receiver in a wireless transmit/receive unit (WTRU) may receive one or more physical downlink control channel (PDCCH) transmissions comprising downlink control information (DCI). The WTRU may determine a transmission profile associated with an uplink control information (UCI). Based on the transmission profile, the WTRU may determine one or more transmission characteristics associated with the transmission of the UCI. The WTRU may transmit the UCI over a physical uplink control channel (PUCCH). The UCI may be transmitted using transmission character-
(Continued)

istics determined by the WTRU. The WTRU may transmit the UCI based on at least one of a control resource set (CORESET), a search space, or a radio network temporary identifier (RNTI). The WTRU may determine a transmission profile differently based on what the UCI may comprise.

20 Claims, 6 Drawing Sheets

Related U.S. Application Data on Apr. 3, 2018, provisional application No. 62/585,937, filed on Nov. 14, 2017, provisional application No. 62/519,585, filed on Jun. 14, 2017.

(56) References Cited

U.S. PATENT DOCUMENTS

| | | | |
|---|---|---|---|
| 2010/0098012 A1 | 4/2010 | Bala et al. | |
| 2011/0170499 A1 | 7/2011 | Nayeb Nazar et al. | |
| 2012/0051319 A1* | 3/2012 | Kwon | H04W 72/0406 370/329 |
| 2012/0076023 A1* | 3/2012 | Ko | H04B 7/0478 370/252 |
| 2012/0113831 A1* | 5/2012 | Pelletier | H04L 5/0058 370/252 |
| 2012/0230268 A1 | 9/2012 | Marinier et al. | |
| 2013/0163532 A1* | 6/2013 | Anderson | H04W 72/1278 370/329 |
| 2013/0163533 A1* | 6/2013 | Anderson | H04W 72/1284 370/329 |
| 2013/0163534 A1* | 6/2013 | Anderson | H04L 1/0026 370/329 |
| 2013/0163535 A1* | 6/2013 | Anderson | H04L 1/0041 370/329 |
| 2013/0163536 A1* | 6/2013 | Anderson | H04L 5/0037 370/329 |
| 2013/0163537 A1* | 6/2013 | Anderson | H04L 1/1671 370/329 |
| 2013/0208691 A1* | 8/2013 | Yang | H04L 5/0094 370/329 |
| 2013/0242923 A1* | 9/2013 | Yang | H04L 1/1861 370/329 |
| 2014/0029528 A1* | 1/2014 | Han | H04W 72/0406 370/329 |
| 2014/0056278 A1* | 2/2014 | Marinier | H04W 52/367 370/330 |
| 2014/0219202 A1 | 8/2014 | Kim et al. | |
| 2016/0135147 A1* | 5/2016 | Ouchi | H04W 72/042 370/329 |
| 2016/0226629 A1* | 8/2016 | Liu | H04L 1/0046 |
| 2016/0226645 A1* | 8/2016 | Kim | H04W 72/0413 |
| 2016/0295574 A1* | 10/2016 | Papasakellariou | H04W 52/146 |
| 2017/0013565 A1 | 1/2017 | Pelletier et al. | |
| 2017/0013612 A1* | 1/2017 | Nayeb Nazar | H04W 72/0446 |
| 2017/0041923 A1* | 2/2017 | Park | H04L 5/001 |
| 2017/0105179 A1 | 4/2017 | Kusashima et al. | |
| 2018/0123744 A1* | 5/2018 | Nogami | H04L 5/0053 |
| 2018/0167915 A1 | 6/2018 | Lee et al. | |

FOREIGN PATENT DOCUMENTS

| | | |
|---|---|---|
| JP | 2012-517747 A | 8/2012 |
| JP | 2013-507067 A | 2/2013 |
| JP | 2017-507583 A | 3/2017 |
| RU | 2499367 C2 | 11/2013 |
| WO | WO 2008-101053 A2 | 8/2008 |
| WO | 2011/041623 A1 | 4/2011 |
| WO | WO 2013/027967 A2 | 2/2013 |
| WO | WO 2014-151150 A1 | 9/2014 |
| WO | WO 2015/021318 A2 | 2/2015 |
| WO | WO 2015-171234 A1 | 11/2015 |
| WO | 2016/195177 A1 | 12/2016 |

OTHER PUBLICATIONS

3rd Generation Partnership Project (3GPP), R1-1705455, "Discussion on UCI and Data Multiplexing for Uplink Control Channel", Panasonic, 3GPP TSG RAN WG1 Meeting #88bis, Spokane, USA, Apr. 3-7, 2017, pp. 1-3.

3rd Generation Partnership Project (3GPP), R1-1708519, "On Low-Latency UCI Transmission", Nokia, Alcatel-Lucent Shanghai Bell, 3GPP TSG RAN WG1#89, Hangzhou, P.R. China, May 15-19, 2017, 2 pages.

3rd Generation Partnership Project (3GPP), R1-1709109, "On Retransmission Decoder Throughput Issues and CBG-based HARQ Protocol", Ericsson, 3GPP TSG-RAN WG1 Meeting #89, Hangzhou, P.R. China, May 15-19, 2017, pp. 1-4.

3rd Generation Partnership Project (3GPP), R1-1709062, "Overview of DL Control Channel Design", Ericsson, 3GPP TSG-RAN WG1 Meeting #89, Hangzhou, China, May 15-19, 2017, 13 pages.

RU 2499367 C2 Machine translation, included, cited in an office action dated Oct. 21, 2021, issued in related Russian application No. 2019141040.

$3^{rd}$ Generation Partnership Project (3GPP), CORESET and BD for NR-PDCCH, Vivo, R1-1707232, 3GPP TSG RAN WG1, Meeting #89, Hangzhou, P.R. China, May 15-19, 2017, 3 pagers.

$3^{rd}$ Generation Partnership Project (3GPP), "Further details of common control signaling", CATT, R1-1702091, 3GPP TSG RAN WG1, Meeting #88, Athens, Greece, Feb. 13-17, 2017, 5 pages.

$3^{rd}$ Generation Partnership Project (3GPP), "CSI Multiplexing and Collision Handling in Periodic Feedback", MediaTek, Inc., R1-124280, 3GPP TSG RAN WG1, Meeting #70bis, San Diego, USA, Oct. 8-12, 2012, 4 pages.

$3^{rd}$ Generation Partnership Project (3GPP), "UL channel transmission for MTC coverage enhancement", LG Electronics, R1-140308, 3GPP TSG RAN WG1, Meeting #76, Prague, Czech Republic, Feb. 10-14, 2014, 5 pages.

$3^{rd}$ Generation Partnership Project (3GPP) "Summary of Informal Email Discussion on PUSCH", Sierra Wireless, R1-157501, 3GPP TSG RAN WG1, Meeting #83, Anaheim, USA, Nov. 15-22, 2015, 15 pages.

\* cited by examiner

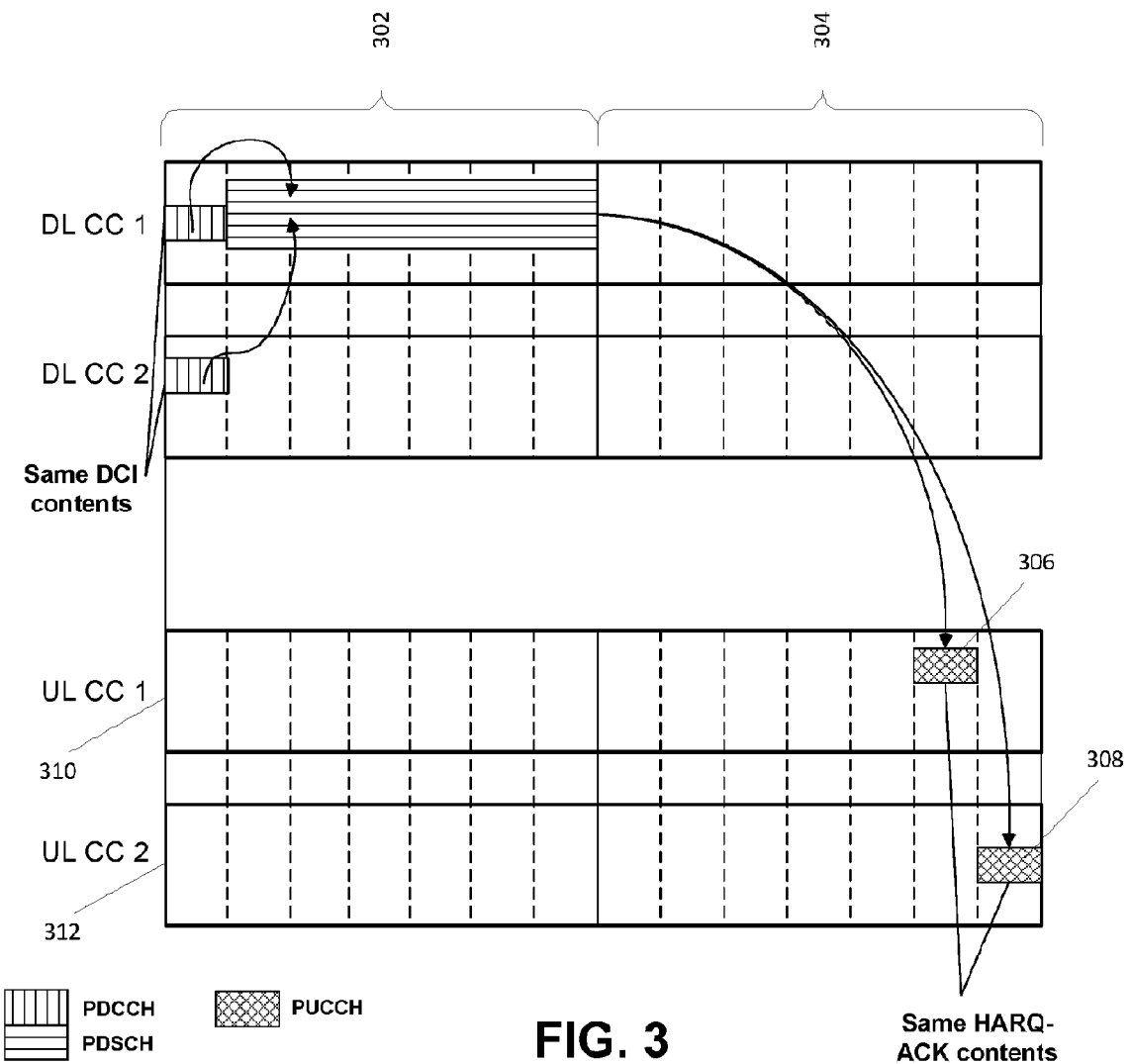

RELIABLE CONTROL SIGNALING

CROSS REFERENCE TO RELATED APPLICATIONS

This application is the National Stage entry under 35 U.S.C. § 371 of Patent Cooperation Treaty Application PCT/US2018/036967, filed Jun. 11, 2018, which claims the benefit of U.S. Provisional Patent Application Nos. 62/519,585 filed on Jun. 14, 2017, 62/585,937 filed on Nov. 14, 2017, 62/652,002 filed on Apr. 3, 2018, and 62/667,015 filed on May 4, 2018, the contents of which are hereby incorporated by reference herein.

BACKGROUND

Mobile communications using wireless communication continue to evolve. A fifth generation or Next Gen (NG) wireless systems may be referred to as 5G or New Radio (NR). A previous generation of mobile communication may be, for example, fourth generation (4G) long term evolution (LTE). A set of use cases for NR may be generally classified into one of an enhanced mobile broadband (eMBB), an ultra-reliable and low-latency communications (URLLC), or massive machine type communication (mMTC). Current processing and transmission mechanisms used for such uses cases may be less efficient.

SUMMARY

Systems, methods, and instrumentalities are disclosed for reliable control signaling, for example, in New Radio (NR). A receiver in a wireless transmit/receive unit (WTRU) may receive one or more physical downlink control channel (PDCCH) transmissions comprising downlink control information (DCI). The WTRU may determine a transmission profile associated with an uplink control information (UCI). The transmission profile may be determined based on one or more of the following: an identity of a logical channel or a logical channel group for data associated with the UCI, and a property of the at least one PDCCH transmission. The PDCCH transmission may be mapped to one or more resources of a control resource set (CORESET).

The transmission profile may be determined based on one or more of: one or more DCI fields in the received DCI, or an identity of a bandwidth part (BWP) used for transmitting one or more of the DCI or the UCI.

The DCI may include a first DCI and a second DCI. A DCI field may indicate a hybrid automatic repeat request (HARQ) process index or a logical channel priority. The first DCI may be received using a first control resource set (CORESET), and the second DCI may be received using a second CORESET. The first CORESET or the second CORESET may include one or more of the following: a component carrier, at least one BWP, a subset of resource blocks within each bandwidth part, a set of time symbols within a slot or mini-slot, a sub-carrier spacing, a subset of slots within a subframe, or at least one reference signal.

The UCI may include a first UCI and a second UCI. The first UCI or the second UCI may include one or more of a hybrid automatic repeat request (HARQ), a scheduling request (SR), or a channel quality indicator (CQI). The UCI may be transmitted based on a CORESET, a search space, or a RNTI. The UCI may be associated with a PDSCH transmission or a PDCCH transmission. In an example, the first UCI or the second UCI may include feedback information bits for a data transmission allocated by the first DCI or the second DCI. In another example, the second UCI may correspond to a redundant transmission of the first UCI.

Based on the transmission profile, the WTRU may determine one or more transmission characteristics associated with the transmission of the UCI. The one or more transmission characteristics may include at least one of the following: one or more coding parameters, one or more transmission power parameters, one or more resource allocation parameters, or a priority level.

The WTRU may transmit the UCI over a physical uplink control channel (PUCCH). The UCI may be transmitted using transmission characteristics determined by the WTRU. The WTRU may transmit the UCI based on one or more of a CORESET, a search space, or a radio network temporary identifier (RNTI). The PUCCH carrying the UCI may be transmitted on an uplink (UL) carrier and/or a supplementary uplink (SUL) carrier.

The WTRU may determine a transmission profile associated with a PDSCH transmission based on one or more of the following, for example, if the UCI comprises a hybrid automatic repeat request acknowledgement (HARQ ACK): a duration of the transmission, a bandwidth part, a numerology, or a modulation and coding scheme (MCS) table for control information.

The WTRU may determine a transmission profile based on one or more of the following, for example, if the UCI comprises a channel state information (CSI): a value of block error rate (BLER) target associated with the CSI, or a CSI report setting.

The WTRU may determine a transmission profile based on one or more of the following, for example, if the UCI comprises a scheduling request (SR) associated with a physical uplink control channel (PUCCH) resource configured for a transmission of the SR: a sub-carrier spacing, a duration of a PUCCH resource, a logical channel associated with an SR configuration, a priority associated with the logical channel.

BRIEF DESCRIPTION OF THE DRAWINGS

A more detailed understanding may be had from the following description, given by way of example in conjunction with the accompanying drawings.

FIG. 3 illustrates an example of DCI and uplink control information (UCI) diversity.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
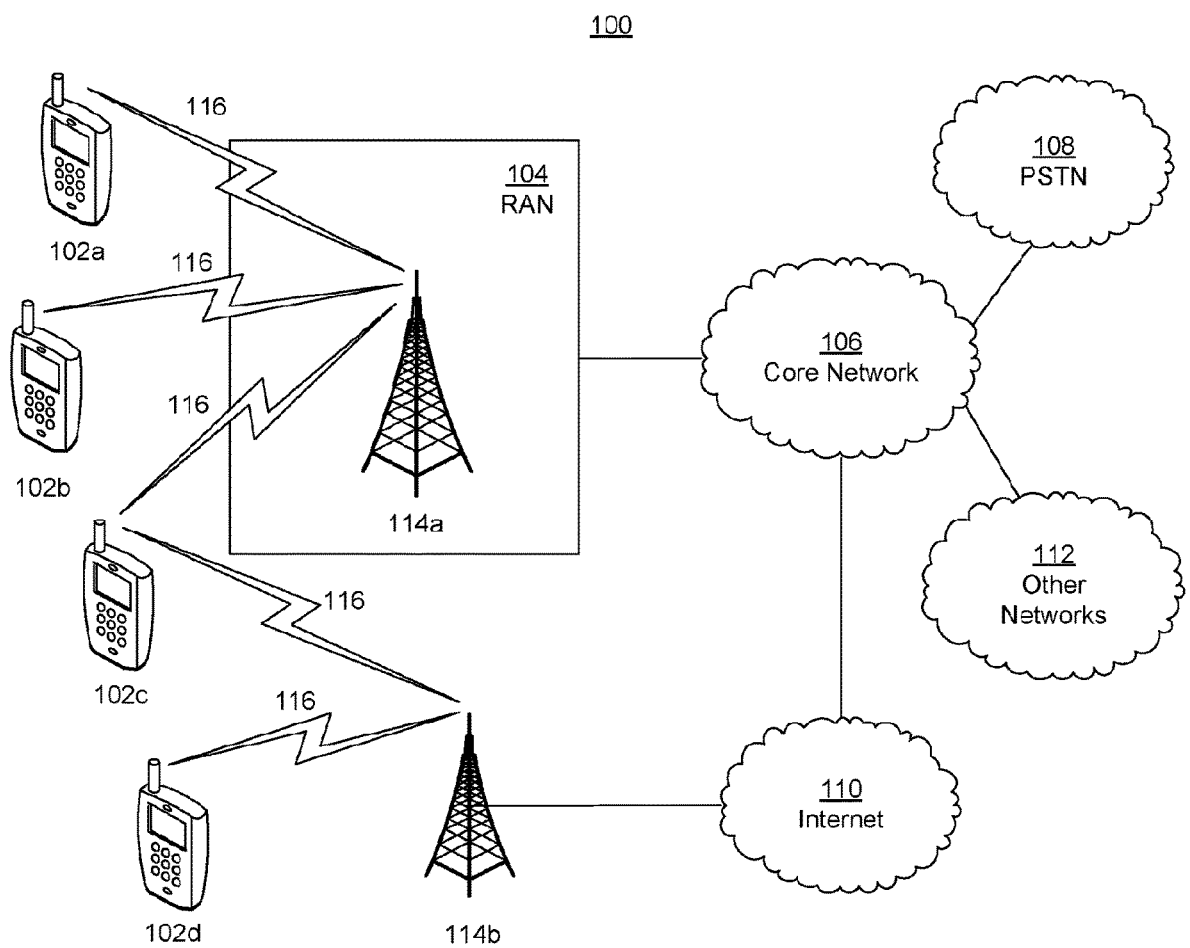
FIG. 1A is a system diagram illustrating an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
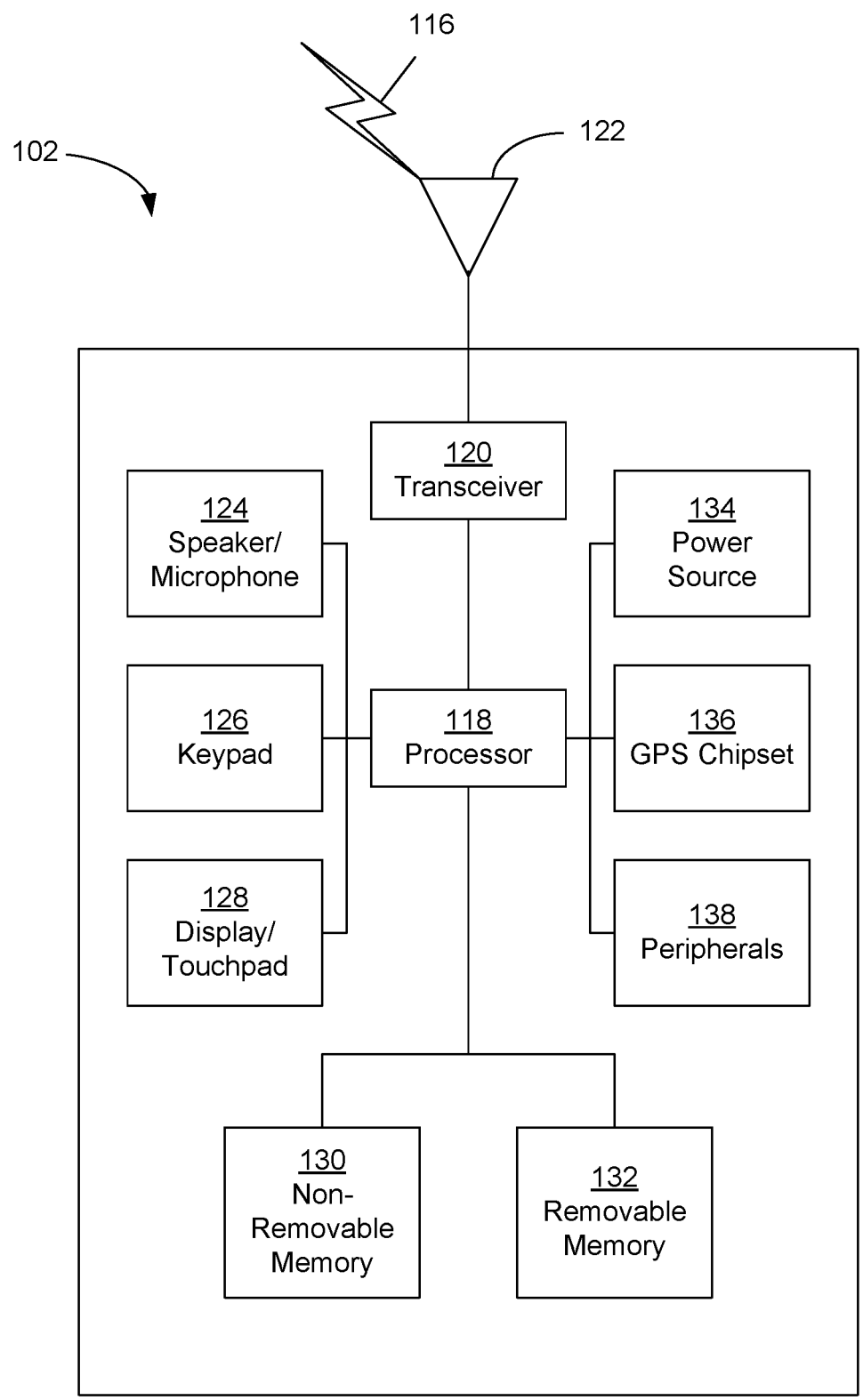
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
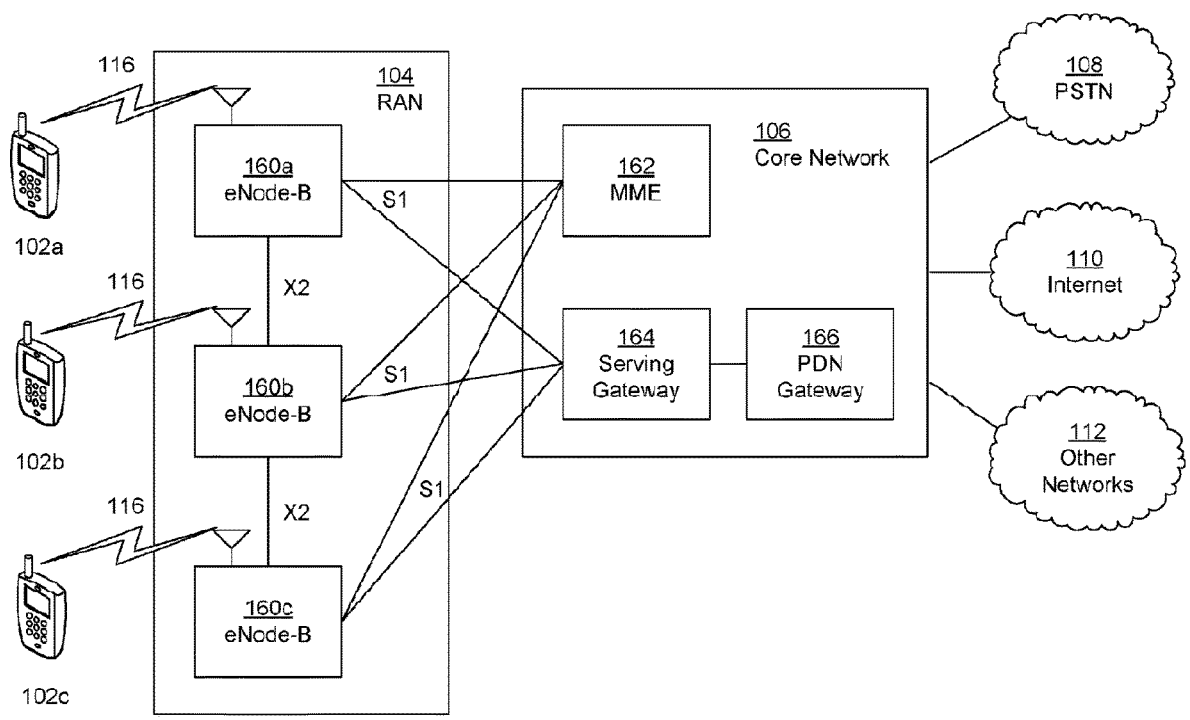
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
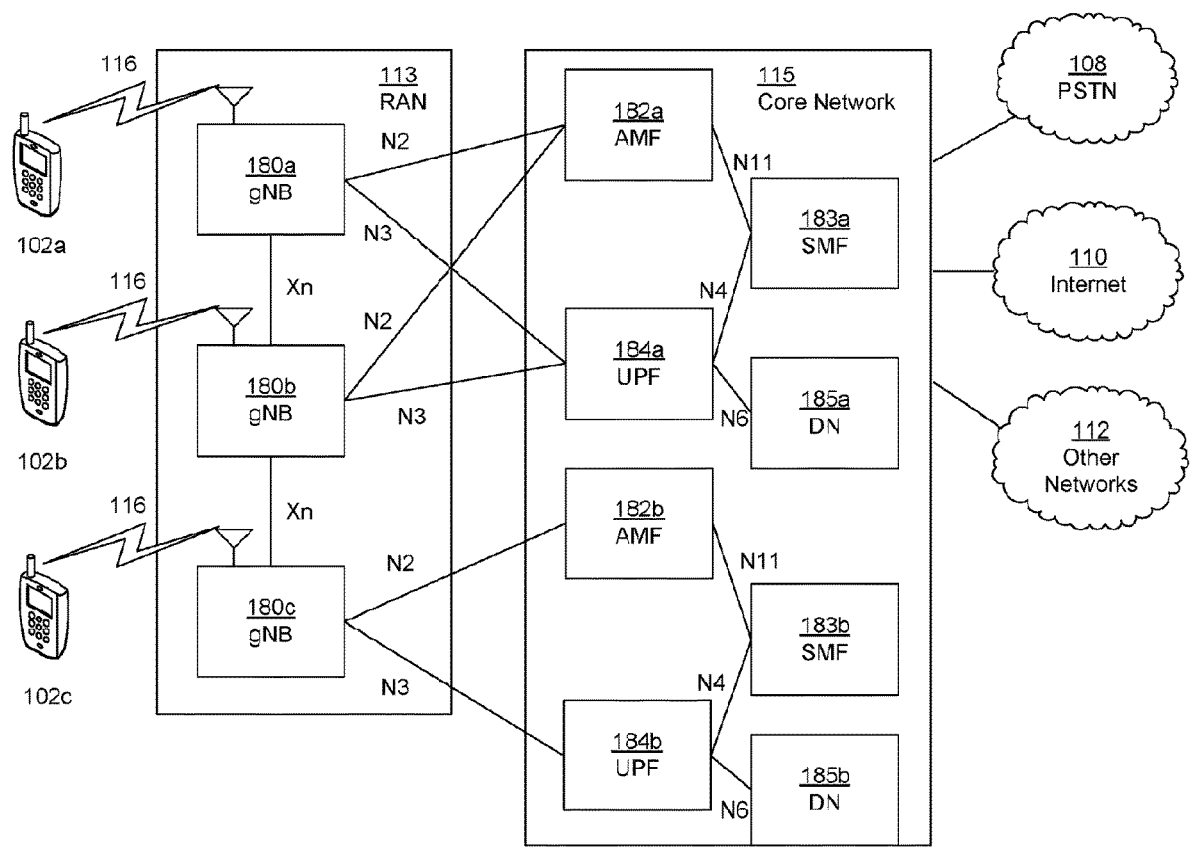
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New radio (NR) may be operable with current and future mobile wireless communications systems. NR use cases may include, for example, eMBB, Ultra High Reliability and Low Latency Communications (URLLC) and massive Machine Type Communications (mMTC). NR may support transmission in high frequency bands, such as centimeter-wave (cm-wave) and/or millimeter-wave (mm-wave) frequencies. Operation in cm-wave and/or mm-wave frequency bands may present propagation-related challenges, e.g., in view of higher path loss and shadowing.

High-reliability services may be supported, for example, by very low block error rates, e.g., of the order of 0.001%. Lower error rates may be achieved, for example, with higher reliability for physical layer control information (e.g., hybrid automatic request acknowledgement (HARQ-ACK), uplink grants and downlink assignments). In an example (e.g., for HARQ-ACK) a probability of misinterpreting a NACK as an ACK at a level of 0.1% may be adequate for some (e.g., general) mobile broadband services, but may be too large, for example, for ultra-reliable services (e.g., since a negative-acknowledgement (NACK) to acknowledgement (ACK) misinterpretation event may result in loss of a transport block).

A WTRU may be configured for multiple concurrent transmissions. NR may support a WTRU configuration that may include one or more cells for a given MAC entity and/or for multiple MAC entities. A configuration of one cell may provide single cell operation. A configuration of multiple cells may provide carrier aggregation (CA), for example, NR CA operation. A configuration of multiple MAC entities may include dual connectivity (DC) for NR (NR DC). A configuration of multiple MAC entities may provide combination of LTE and NR (e.g., evolved UMTS terrestrial radio access network (E-UTRAN) New Radio—Dual Connectivity (EN-DC)). NR may provide a WTRU configuration comprising a cell configured with one downlink carrier, one uplink carrier, and a supplementary uplink carrier (SUL). NR may support a cell configured with one or more bandwidth part(s) (BWPs). A BWP may be characterized by at least one of a frequency location (e.g., a center frequency and/or a frequency bandwidth), or a numerology.

For EN-DC, NR CA and NR DC in licensed bands, various combinations (e.g., different combinations) of carriers may introduce various timing relationships (e.g., different timing relationships) between transmissions associated with a WTRU (or between transmissions that may at least partly overlap in time) in terms one or more of numerology, transmission start time, or transmission duration. For example, each of the configured component carriers (downlink (DL) and/or uplink (UL)) and/or bandwidth parts (BWPs) (DL and/or UL) for a WTRU may have the same or different numerology, and overlapping transmissions between different component carriers/BWPs may have the same or different starting time; and the same or different physical uplink shared channel (PUSCH)/physical uplink control channel (PUCCH) transmission duration.

Timing and/or scheduling aspects may be provided, for example, in case of asynchronous transmissions and/or in cases of partial and/or complete overlapping between different uplink transmissions associated with a WTRU. In an example, different transmissions may operate with different HARQ timelines, for example, based on dynamic scheduling information. For example, such scheduling information may include dynamically variable scheduling-related delay components. The dynamically variable scheduling-related delay components may be provided via downlink control information (DCI)). The scheduling-related delay components may include one or more of K1, K2, N1, or N2. K1 may be a delay between a downlink (DL) data (PDSCH) reception and its corresponding ACK transmission on uplink (UL). K2 may be a delay between an UL grant reception in DL and an UL data transmission (e.g., PUSCH transmission). N1 may be a number of OFDM symbols used for a WTRU processing from the end of NR-PDSCH reception to the earliest possible start of the corresponding ACK/NACK transmission, for example, from the WTRU perspective. N2 may be a number of OFDM symbols used for a WTRU processing from the end of NR-PDCCH comprising the UL grant reception to the earliest possible start of the corresponding NR-PUSCH transmission, for example, from the WTRU perspective.

A scheduler may adjust an error probability of control information, for example, by selecting transmission power parameters (e.g., associated with an uplink transmission) and/or aggregation level (e.g., associated with a downlink transmission). Achieving very low error rates may be problematic.

In an example, very low error rates may not be attained by parameter adjustment using transmission techniques, for example, in presence of bursty interference and/or other channel impairments (e.g., severe shadowing at mm-wave frequencies).

Spectrum efficiency and user throughput may be severely degraded, for example, when operating at very low error rates, as significantly more resources (time, frequency, and/or power) may be consumed than when operating at typical error rates, when such techniques are applied to one or more types of transmissions. Differentiated processing between ultra-reliable transmissions and other transmissions (e.g., by resource segregation) may be less efficient, e.g., given that ultra-reliable traffic may be bursty.

Very low error rates (e.g., for ultra-reliable services) may be achieved. Efficient operation (e.g., in a system and/or a WTRU) with ultra-reliable and other (e.g., non-ultra reliable) mobile broadband data traffic may be achieved.

Uplink control information (UCI) may comprise, for example, HARQ feedback information (e.g., HARQ-ACK), scheduling request (SR), and/or channel state information (CSI). UCI may be transmitted over an uplink control channel (e.g., physical uplink control channel (PUCCH)), and/or over an uplink data channel (e.g., physical uplink shared channel (PUSCH)). UCI may be transmitted with or without multiplexing with uplink data. HARQ feedback information (e.g., HARQ-ACK) may pertain to transport block(s), code block(s) and/or code block group(s).

Downlink control information (DCI) may refer to physical control signaling that may be received from a network (e.g., uplink grants, downlink assignments, power control commands, slot format indicators, HARQ information and so on). DCI may be transmitted, for example, over a downlink control channel (e.g., PDCCH) (e.g., in a common or WTRU-specific search space or over a group-common control channel (e.g., on PDCCH)). A PDCCH may be mapped to resources of a control resource set (CORESET). A WTRU may attempt decoding PDCCH, for example, from one or more search spaces within a CORESET. A WTRU may be configured, for example, with at least one CORESET.

DCI diversity may be provided. In an example, transmission reliability of DCI may be increased, for example, by transmission of multiple DCI instances over resources separated in time, frequency, and/or space domains. Multiple instances may provide a diversity gain against short-term fading, long-term fading, and/or interference.

A DCI (e.g., each DCI instance) may be transmitted over a downlink physical control channel (e.g., PDCCH, group-common PDCCH, PHICH and so on). An instance may be transmitted over PDSCH (e.g., when DCI on PDSCH may be supported). A PDCCH (e.g., each PDCCH) may be received based on a CORESET that may be configured by higher layers. A configuration may include one or more parameters. For example, a configuration may include a component carrier or a serving cell, one or more bandwidth parts (BWPs), a subset of resource blocks within a BWP (e.g., each BWP), a set of time symbols within a slot or a mini-slot, a sub-carrier spacing, a subset of slots within a subframe, and/or one or more reference signals (e.g., CSI-RS). An independent configuration of one or more parameters may provide diversity in time, frequency, and/or space. In an example, frequency diversity may be provided (e.g., by configuring different component carriers or BWPs between CORESETs) with or without providing space and/or time diversity (e.g., by configuring different sets of time symbols and/or different reference signals).

DCI diversity may be configurable. For example, DCI diversity may be activated or de-activated. The activation or deactivation of DCI diversity, for example, may be based on MAC layer signaling or physical layer signaling. In an example, a WTRU may receive an activation command based on a first CORESET to initiate monitoring of a second DCI instance on a second CORESET. A WTRU may receive a de-activation command for monitoring a DCI instance on a specific CORESET.

DCI diversity may be applied. Contents of a DCI instance (e.g., each DCI instance) may be set according to one or more of the following: (i) same contents transmitted over a multiple DCI instances (e.g., repetition); (ii) same contents transmitted over multiple DCI instances (e.g., block encoding), or (iii) nature of contents.

In an example, each of the multiple DCI instances may include and encode the same information bits for at least one type or format of DCI (e.g., HARQ-ACK for PUSCH, PDSCH assignment, PUSCH grant). A DCI may be decodable (e.g., completely decodable) from the reception of an instance (e.g., a single instance).

In an example, a DCI may be encoded, for example, by segmenting the DCI into N blocks and encoding the DCI into D blocks. In an example, a decoding of at least N of the D DCI instances (e.g., at a receiver) may be sufficient to recover the entirety of the DCI. In an example, encoding may consist of a parity code.

In an example, DCI instances may include one or more of the following: information associated with at least one DL data transmission over PDSCH, or information associated with at least one UL data transmission over PUSCH.

Figure 2:
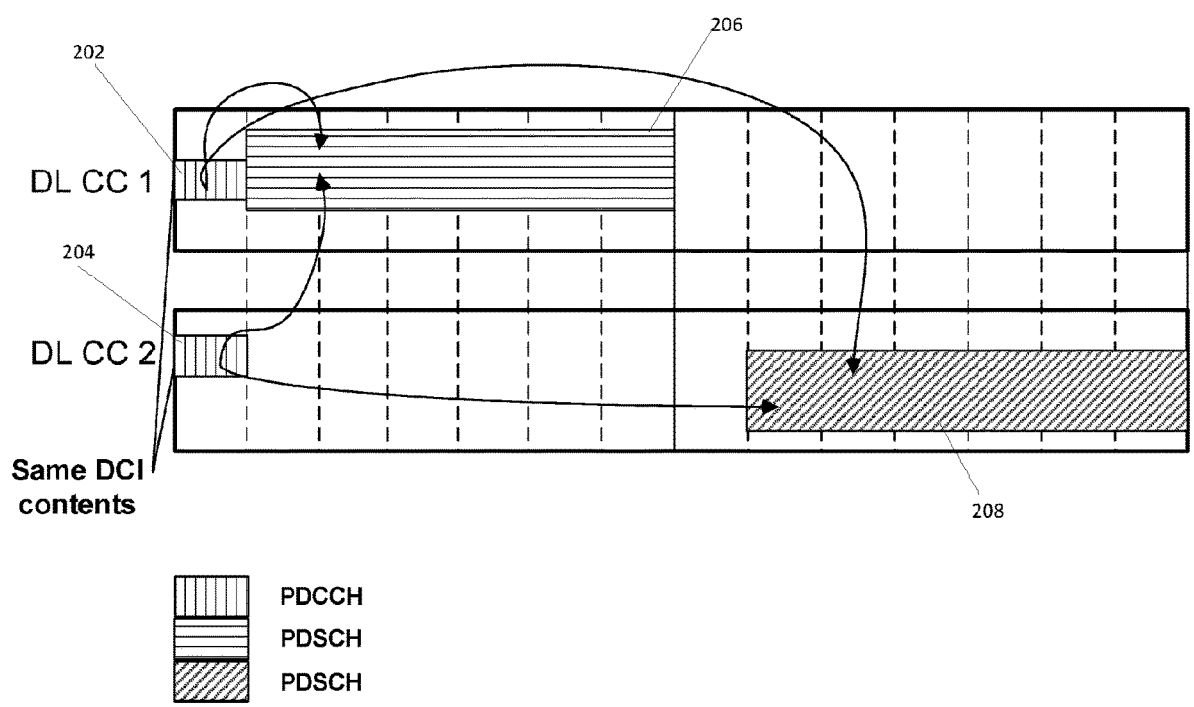
FIG. 2 illustrates an example of downlink control information (DCI) diversity.

In an example, a WTRU may be configured to monitor PDCCH over multiple CORESETs (e.g., two CORESETs). The WTRU may monitor the PDCCH on different carriers or bandwidth parts. A WTRU may receive, for example, multiple DCI instances (e.g., up to two DCI instances). In an example, the DCI instances may include the same information received by the WTRU via PDCCH in multiple carriers (e.g., each carrier may be received on a carrier, in a multiple DCI case). Information on a DCI (e.g., each DCI) may include PDSCH (or PUSCH) assignments/grants for multiple carriers (e.g., both carriers). A WTRU may receive PDSCH or transmit PUSCH on multiple carriers (e.g., both carriers), for example, even in a case when a (e.g., one) of the DCI instances may not be successfully decoded. Very low BLER may be achieved with low latency, for example, when the multiple PSDCH transmissions (e.g., both PDSCH transmissions) or PUSCH transmissions may be encoded into the same transport block, e.g., since the DCI and the data may be (e.g., are) independently protected by diversity, as illustrated by example in FIG. 2. As illustrated in FIG. 2, DCI on downlink component carrier 1 (DL CC1) 202 and the DCI on the downlink component carrier 2 (DL CC2) 204 may have same contents. For example, each of the DCI may include information associated with PDSCH 206 and PSDCH 208.

A DCI index may be provided. In an example, a DCI instance (e.g., each DCI instance) may include a field (e.g., DCI index) that may identify DCI contents. A WTRU may discard DCI instances that may include the same information. The duplicate DCIs may be discarded to reduce processing. In an example, a WTRU may receive a first DCI instance with a first value of the DCI index. A WTRU may receive subsequent DCI instances that may include the same value of the DCI index (e.g., within a set of CORESETs over which DCI diversity may be configured within a time period). A WTRU may (e.g., upon receipt) discard the subsequent DCI instances. A WTRU may use a DCI index, for example, to differentiate between a diversity DCI and a DCI that may include new information.

UCI diversity may be provided. Transmission reliability of UCI may be increased, for example, by transmission of multiple instances over resources that may be separated in one or more of the following: time, frequency, or space domains. Multiple UCI instances may, for example, provide a diversity gain against short-term fading, long-term fading, and/or interference. A UCI instance (e.g., each UCI instance) may be transmitted over a physical uplink control channel (PUCCH) or a physical uplink shared channel (PUCCH). In an example, UCI diversity may be applicable to certain types of UCI (e.g., HARQ-ACK).

In an example, UCI instances may be transmitted over multiple carriers and/or bandwidth parts, a WTRU may be configured to operate on. As illustrated in FIG. 3, the same HARQ-ACK information that may pertain to a downlink assignment (e.g., received in a previous slot 302) may be transmitted over multiple PUCCH instances (e.g., two PUCCH instances 306 and 308). The two PUCCH instances may be include a first UCI instance 306 that may be transmitted on an UL component carrier one (CC1) 310 and a second UCI instance 308 that may be transmitted on UL component carrier two (CC2) 312. The UCI may be transmitted in slot 2 304. Each of the first UCI instance 306 and the second UCI instance 308 may include similar information (e.g., same HARQ ACK-NACK information).

FIG. 3 is an example of implementing a DCI diversity and a UCI diversity. In an example, a UCI instance (e.g., each UCI instances) may include transmission of an OFDM symbol (e.g., a single OFDM symbol) in adjacent symbols (e.g., using short PUCCH format). Other examples in the time domain may include, for example, transmission in the same OFDM symbol or transmission in different slots. Resources (e.g., RB, time symbol, slot, etc.) that may be occupied by a UCI instance (e.g., each UCI instance) may be configured independently.

In an example, UCI instances may be transmitted over multiple beams. For example, multiple beams may be transmitted using different pre-coders. A WTRU may be configured for beam determination associated with a UCI instance (e.g., each UCI instance). The WTRU may be configured with information including one or more of the following: a beam index, a beam process identity, an SRS indicator, or a CSI-RS indicator (e.g., when beam correspondence exists), etc. Information used by the WTRU for beam determination (e.g., for PUCCH) may be configured by higher layers for a UCI instance (e.g., each UCI instance) or may be indicated in a DCI that may include an ACK/NACK resource indicator (ARI). Information used by the WTRU for beam determination (e.g., for PUSCH) may be indicated via a DCI that may include a grant associated with a beam.

Information used by the WTRU for beam determination may be derived (e.g., implicitly derived) from a PDCCH that may include an assignment. In an example, a beam associated with transmission of a PUCCH instance may be derived from a reference signal (e.g., a channel state information reference signal (CSI-RS)) or a beam indicator that may be associated with a control resource set or a PDCCH transmission that may include an assignment. This approach may be used, for example, when PDCCH diversity (or the DCI diversity) may be used in addition to the UCI diversity. A WTRU may transmit a PUCCH instance (e.g., one PUCCH instance) for a received PDCCH instance (e.g., each received PDCCH instance). The PDCCH instance may include an assignment, for example, when and or how UCI may be transmitted over PUCCH.

A Supplementary Uplink (SUL) may be provided. In an example, a WTRU may be configured with a SUL carrier for at least one serving cell. The WTRU may be configured to transmit UCI including, for example, a scheduling request (SR), channel state information (CSI), or an HARQ ACK/NACK. UCI may be transmitted over the regular UL carrier and the SUL carrier associated with the serving cell.

UCI diversity may be applied. Contents of a UCI instance (e.g., each UCI instance) may be set, for example, according to one or more of the: (i) whether same contents are to be transmitted over each of the multiple UCI instances (e.g., repetition); (ii) whether same contents are to be transmitted over UCI instances (e.g., block encoding); or (iii) nature of contents.

In an example, a UCI instance (e.g., each UCI instance) may include and encode same information bits for at least one type of UCI (e.g., HARQ-ACK). A UCI may be decodable from the reception of a single instance. In an example, a UCI may be encoded, for example, by segmenting the UCI into N blocks and encoding the segmented N blocks into D blocks. In an example, decoding of at least N blocks of the D UCI instances at a receiver may be sufficient to recover the entirety of the UCI. In an example, encoding may include a parity code.

In an example (e.g., where DCI diversity may not be applied), a UCI may include a set of HARQ-ACK bits. An association between a specific HARQ-ACK bit and a reception outcome of a transport block may be determined, for example, based on a downlink assignment index.

In an example (e.g., where DCI diversity may be applied), a set of HARQ-ACK bits may be generated and transmitted, for example, for each of the DCI instances that may be configured to be received in diversity (e.g., based on the same contents). This may occur, for example, irrespective of whether a DCI instance may be successfully decoded. A WTRU may report NACK for transport blocks corresponding to a DCI instance that may not be received, for example, when the WTRU may be configured to receive multiple DCI instances (e.g., two DCI instances) in diversity, but receives fewer than the configured DCI instances (e.g., configured two DCI instances). Reporting may be performed, for example, when a WTRU receives at least one DCI instance. A network may be allowed to determine missed assignments from a DCI instance (e.g., each DCI instance). Determination of missed assignments may be useful for link adaptation of PDCCH.

In an example, DCI diversity may be applied. A WTRU may report a set of HARQ-ACK bits for a set of DCI instances that may be configured to be received in diversity, for example, when the WTRU receives at least one DCI instance. A WTRU may report an indication of a subset of DCI instances that may be successfully decoded within a set of DCI instances in diversity.

A WTRU may receive more than one DCIs that may indicate DL data for the same HARQ process and transport block(s). The DCIs may be encoded using different redundancy versions. A WTRU may report one HARQ-ACK bit per transport block (e.g., irrespective of the number of received instances of PDSCH that may include data for the transport block). A WTRU may transmit a HARQ-ACK bit per transport block and a PDSCH instance that may include data of the transport block (e.g., with the same value).

Power control with UCI diversity may be provided. Transmission power associated with a transmission (e.g., a PUCCH transmission or a PUSCH transmission) may be set independently, for example, when UCI diversity is applied. For example, a separate configuration of one or more reference signals may be used for path loss estimation and other parameters may be used to determine transmission power.

Power control with UCI diversity for determination of transmit power control (TPC) may be provided. A WTRU may determine a TPC command that may be applicable to a transmission for which UCI diversity may be applied.

In an exemplary determination of TPC, a WTRU may apply similar TPC adjustment to each of the multiple UCI instance transmissions. A TPC adjustment may be received, for example, from a DCI that may be associated with a UCI transmission. For example, a DCI may include a DL assignment or a CSI request.

In an exemplary determination of TPC, a WTRU may apply a separate TPC adjustment to each of the multiple UCI instance transmissions. A TPC adjustment (e.g., each TPC adjustment) may be received, for example, via a DCI that may be associated with a UCI transmission. In an example, an associated DCI may include two TPC adjustment values, for example, when a UCI diversity may be configured using two transmissions.

In an exemplary determination of TPC, a WTRU may apply a separate TPC adjustment to each of the UCI instance transmissions. A TPC adjustment may be received for each of the UCI instances, for example, via a specific DCI instance that may be associated with the UCI instance.

Power control with power control modes, for example, for carrier aggregation (CA) and/or dual connectivity (DC) may be provided. In an example, a WTRU may apply a priority level to a transmission that may include UCI, for example, when UCI diversity is activated. The WTRU may apply the priority level, for example, if configured with a power control mode (PCM). The WTRU may be configured to group one or more type(s) of transmission(s). The WTRU may be configured to allocate at least an amount (e.g., a fraction) of the total WTRU available power to a group of transmissions e.g., with a minimum guaranteed power. The WTRU may determine that transmissions that include UCI are part of a same group of transmissions. The WTRU may perform such grouping, for example, if the UCI is associated with a transmission profile. For example, such transmission profile may correspond to an ultra-reliable low latency communications (URLLC) type of transmission. The WTRU may assign a higher priority to such group of transmissions than other data transmissions (e.g., data transmissions associated with a transmission profile that corresponds to non-URLLC type of transmission). In a WTRU configured with CA, for example, a transmission that includes at least some UCI generated when applying UCI diversity may have highest priority over other transmissions for a given MAC instance. For a WTRU configured with DC and/or with multiple groups of transmissions, for example, a group of transmissions (or a cell group) with at least one transmission including at least some UCI (generated, e.g., when applying UCI diversity) may have highest priority than other group(s).

Resource allocation may be provided with UCI diversity using PUCCH. A resource and format of a PUCCH transmission may be determined (e.g., when a UCI instance is transmitted over PUCCH), for example, according to one or more example procedures. In an example, a WTRU may be configured with one or more combinations of PUCCH resources. A PUCCH resource (e.g., each PUCCH resource) may correspond to a resource over which a UCI instance may be transmitted. In an example (e.g., with two UCI instances), a combination may be defined as PUCCH resource index #24 on a first CC or bandwidth part and PUCCH resource index #13 on a second CC or bandwidth part. A combination may be referred to as a PUCCH diversity resource or PUCCH diversity super-resource. A WTRU may be configured (e.g., by higher layers) with more than one PUCCH diversity resource. The PUCCH diversity resource may be indicated in a field (e.g., ARI field) of an associated DCI. A WTRU may be configured (e.g., by higher layers) with a pool. The pool may include normal PUCCH resources and PUCCH diversity resources that may allow a network to control (e.g., dynamically control) the use of UCI diversity.

In an example, a WTRU may be configured with DCI diversity in addition to UCI diversity. A WTRU may transmit a UCI instance on a resource that may be indicated by an associated DCI instance. A DCI instance (e.g., each DCI instance) may comprise an ARI that may indicate a PUCCH resource. A WTRU may transmit a UCI instance, for example, when the WTRU may have received a corresponding DCI instance.

Transmission of DTX feedback may be provided. In an example, a WTRU may transmit HARQ-ACK information in a specific PUCCH resource. The HARQ-ACK may indicate (e.g., explicitly indicate) that a DL transmission or a DL assignment was not received (e.g., in case of discontinuous transmission (DTX)) from a specific CORESET at a given slot or mini-slot. The timing of a PUCCH resource may be obtained, for example, from a timing of the slot or mini-slot where a DL assignment was not received.

PUCCH interference randomization may be provided. In an example, a PUCCH transmission from two or more WTRUs to two or more transmission/reception points (TRPs) may collide. Interference randomization may be used, for example, to reduce the effect of a strong interfering PUCCH transmission on a victim PUCCH transmission. Interference randomization may be used, for example, by a pair of WTRUs to not use colliding PUCCH resources.

Interference randomization may be utilized to increase transmission diversity. Interference randomization may include, for example, one or more of the following hopping resources: hopping a transmission beam or beam pair, hopping PUCCH symbols within a slot or across slots, or hopping a duplication pattern.

In an example of hopping resources, hopping may be performed within a BWP or across multiple BWPs. A PUCCH transmission (e.g., each PUCCH transmission) may, for example, cycle over a pattern of frequency resources. In an example, hopping may be performed within a PUCCH transmission.

In an example of hopping a transmission beam or beam pair, PUCCH transmissions may cycle among a set of beams. In an example, cycling among beams may be performed, for example, using a beam per set of PUCCH symbols within a PUCCH transmission. In an example of hopping PUCCH symbols within a slot or across slots, a short PUCCH may occupy different symbols of a slot for each of the multiple PUCCH transmissions.

In an example of hopping a duplication pattern, a PUCCH transmission (e.g., each PUCCH transmission) may use multiple duplications. Each of the duplications may use different resources. A subsequent PUCCH transmission (e.g., each subsequent PUCCH transmission) may use a different set (e.g., a distinct set) of resources. The different sets of resources may be used to enable multiple duplications.

Use of interference randomization and/or hopping patterns may be indicated to a WTRU. For example, such use of interference randomization and/or hopping patterns may be indicated dynamically to a WTRU. Hopping patterns may be determined, for example, based on a property of a PUCCH transmission. In an example, a hopping PUCCH configuration may depend on a frame timing, a subframe timing or a slot timing of the PUCCH. In an example, a PUCCH configuration may depend on a PUCCH configuration used for a previous PUCCH transmission. In an example, a hopping PUCCH configuration may depend on a WTRU parameter (e.g., WTRU ID) or a TRP parameter (e.g., TRP ID).

Configuration of PUCCH resources may be provided. A WTRU may be configured to use one or more PUCCH formats or format types (e.g., a short PUCCH or a long PUCCH). A WTRU may be configured with parameters associated with one or more PUCCH formats. A configuration of PUCCH resources may be provided, for example, provided semi-statically.

A configuration of PUCCH resources may include, for example, one or more of: (i) a PUCCH format (e.g., a short PUCCH format or a long PUCCH format); (ii) a PUCCH duration in symbols (e.g., 1 or 2 symbol short PUCCH and duration of long PUCCH); (iii) a waveform used for PUCCH transmission (e.g., cyclic prefix based orthogonal frequency division multiplexing (CP-OFDM) or discrete Fourier transform spread orthogonal frequency division multiplexing (DFT-s-OFDM)); (iv) a numerology used for PUCCH (e.g., a subcarrier spacing, a CP type, etc.); (v) a time location (e.g., a symbol location within a slot where PUCCH may be transmitted); (vi) a frequency location (e.g., subcarriers, PRBs, BandWidth Part (BWP)); (vii) a frequency interlace index (e.g., used to enable FDM of multiple PUCCH on the same PRB or BWP, where a PUCCH transmission may be assigned to one or more interlace within a PRB or BWP); (viii) hopping pattern(s) (e.g., for hopping within a PUCCH transmission or across PUCCH transmissions); (ix) a beam or a beam pair; (x) a duplication pattern (e.g., for a PUCCH transmission that may be duplicated across multiple resources); (xi) an Orthogonal Cover Code (OCC) (e.g., may include whether the OCC applies over time or subcarrier elements); (xii) a cyclic shift; or (xiii) a transmit diversity scheme.

A frequency location may include, for example, a frequency allocation where a PUCCH may be transmitted. The frequency location may be provided, for example, as an offset value. An offset may be applied, for example, to a frequency location of a PDCCH that may configure a PUCCH, or a PDCCH assigning a PDSCH, or a PDSCH. An offset may be applied to a frequency location of a concurrent PUSCH. A frequency location may include, for example, a set of subcarriers, PRBs, and/or BWPs. A set may be used to indicate (e.g., dynamically indicate) a frequency location for a PUCCH transmission instance (e.g., each PUCCH transmission instance). A set may be used, for example, to enable frequency diversity via repetition. A set may be used, for example, to enable frequency hopping.

A configuration (e.g., including a duplication pattern) may include a set of resources over which a PUCCH transmission may be duplicated. Different duplication patterns may be selected (e.g., dynamically selected).

A semi-static configuration may include one or more tables. A table may include a set of codepoints and a set of PUCCH configurations that may be tied to each codepoint in the set of codepoints. In an example, a first table may include configurations for short PUCCH transmissions and a second table may include configurations for long PUCCH transmissions. In an example, a table may be applicable to multiple PUCCH durations and PUCCH formats.

A dynamic indication of PUCCH configuration may be provided. In an example, an indication (e.g., a dynamic indication) may be provided (e.g., to a WTRU) indicating a combination of PUCCH configurations to transmit UCI, such as HARQ A/N or CSI. A dynamic indication may include, for example, a table index and a codepoint index to be used within the table. In an example, a dynamic indication may be provided (e.g., implicitly provided). For example, the dynamic indication may be provided as a function of a transmission (e.g., as a function of a parameter of a PDCCH transmission or a PDSCH transmission). In an example, a hybrid procedure may be used. A WTRU may determine a PUCCH configuration, for example, based on a combination of an explicit index and an implicit relationship. In an example, a WTRU may determine a PUCCH configuration dynamically. In an example, a WTRU may determine a first set of configurations or a PUCCH configuration table and may determine a second set of configurations or a codepoint within a table. For example, the PUCCH configuration table may be determined implicitly, and a second set of configurations or a codepoint may be determined explicitly.

An implicit indication may include one or more of the following: (i) a slot size, (ii) a UL/DL configuration of a slot, (iii) a service type, (iv) UCI multiplexing, (v) feedback timing, (vi) feedback type, or (vii) collision of different feedback types. In an example of a slot size, a mini-slot may indicate use of a short PUCCH or a regular slot may indicate use of a long PUCCH. In an example of a UL/DL configuration of a slot, a WTRU may determine a PUCCH type (e.g., short or long) or a long PUCCH duration, for example, based on the number of symbols assigned for UL transmissions. In an example of a service type, URLLC may involve a PUCCH format for HARQ that may enable higher reliability. In an example, URLLC transmissions may require PUCCH diversity. In an example of UCI multiplexing, transmission of HARQ tied to multiple TBs (e.g., due to multiple carriers or slot aggregation) may have a higher payload PUCCH format. In an example of feedback timing, a feedback timing using an offset less than a threshold may use a first PUCCH table while feedback timing using an offset greater than the threshold may use a second PUCCH table. In an example, a short PUCCH may be used, for example, for a self-contained slot where feedback may be provided in the same slot as DL data. In an example of a feedback type, HARQ feedback may use a first PUCCH configuration while CSI may use a second PUCCH configuration. In an example, a transport block (TB)-based HARQ feedback may use a first PUCCH configuration (e.g., a short PUCCH) and a code block group(CBG)-based HARQ feedback may use a second PUCCH configuration. In an example of a collision between different feedback types (e.g., associated with different service types), a PUCCH configuration for a service type with higher priority may be used. In an example, feedback multiplexing may be used on PUCCH configurations for URLLC service, for example, when eMBB HARQ feedback may collide with URLLC HARQ feedback.

Feedback selection based on PUCCH configuration may be provided. In an example, a WTRU may determine a type of feedback based on the PUCCH configuration to be used for the feedback. A WTRU that is assigned with short PUCCH resources may, for example, determine that a TB-based HARQ feedback may be required for a PDSCH transmission. A WTRU that is assigned with long PUCCH resources may, for example, determine that CBG-based HARQ feedback may be required. In an example, a WTRU may determine a type of CSI feedback, for example, based on a PUCCH configuration.

PUCCH transmissions may be multiplexed. In an example, a WTRU may be configured to multiplex multiple PUCCH transmissions. Multiplexing may be achieved, for example, by assigning multiple PUCCH transmissions on the same resources. A WTRU may be assigned with different frequency interlaces, hopping patterns, and/or orthogonal cover code (OCC) for each of the multiple PUCCH transmissions.

A WTRU may be assigned with resources for multiple PUCCH transmissions. The resources, for example, may be colliding resources. In an example, a WTRU may multiplex multiple UCIs on the same PUCCH resources. In an example, a WTRU may have a priority ranking associated with UCIs. The WTRU may drop UCI or feedback with lower priority. In an example, a WTRU may have a priority ranking associated with the UCIs and may use PUCCH resources for the highest priority UCI and may use another set of PUCCH resources (e.g., a fallback set of PUCCH resources) for another UCI transmission. In an example, a WTRU may use fallback PUCCH resources for multiple UCI transmissions. In an example, each of the multiple UCIs may be assigned a different fallback resource. Fallback resources may enable multiplexing (e.g., efficient multiplexing). In an example, a PUCCH configuration for a UCI may not use interlacing. In an example, a fallback configuration may use an interlacing pattern that may enable multiplexing. In an example, a PUCCH configuration for a UCI may include a BWP offset (e.g., in the event of a collision with another UCI transmission). In an example, short PUCCH configuration timing (e.g., symbol(s) location) may depend on whether a UCI transmission may perceive a collision. In an example, PUCCH hopping configuration may depend on whether a collision occurs.

Differentiated processing may be provided. Determination of a profile applicable to a transmission may be provided. A WTRU may process and transmit UCI, for example, according to a transmission profile (e.g., a determined transmission profile) that may be associated with the UCI. A transmission profile may be determined, for example, so that an amount of resources and prioritization may meet a reliability objective for a UCI. Such determination of a transmission profile may allow efficient utilization of resources.

In an example, a transmission profile may be associated with uplink data or sidelink data. For example, a transmission profile associated with uplink data or sidelink data may be used to allow prioritization between uplink data or sidelink data and UCI of different profiles.

Transmission profile applicable to DCI, UCI, or data may be determined. In an example, a transmission profile associated with UCI may be equivalent to or determined from, for example, one or more of the following: (i) a transmission profile for an associated downlink data transmission (e.g., for a HARQ-ACK or a CSI); (ii) a transmission profile for an associated uplink data transmission (e.g., for an SR); or (iii) a bandwidth part on which the UCI is transmitted.

A transmission profile associated with UCI or uplink data may be determined, for example, based on one or more of the following: (i) a logical channel or logical channel group from which data may be transmitted based on higher layer configuration (e.g., a transmission profile may be configured for each logical channel or logical channel group, or the WTRU may determine a transmission profile based on a configuration of a logical channel (LCH) to one or more physical layer properties for a given transmission e.g. a transmission duration or similar); (ii) a logical channel or logical channel group of data that may have triggered an SR; (iii) a value of a field in DCI that may be associated with a transmission of UCI or uplink data (e.g., an explicit indication of transmission profile, or implicitly from an existing field (e.g., a HARQ process index) or a field that may be used for logical channel prioritization (e.g., for an uplink grant), or a radio network temporary identifier (RNTI) value that may be used to mask a cyclic redundancy check (CRC); (iv) a property of a PDCCH that may be associated with a transmission of UCI or uplink data (e.g., a CORESET, a monitoring period, a determination whether the PDCCH is monitored at the beginning of a slot, a search space or aggregation level that may be used for PDCCH decoding, or a bandwidth part), such as where a transmission profile may be configured (e.g., by higher layers) for a CORESET (e.g., each CORESET) or a PDCCH configuration (e.g., each PDCCH configuration); (v) higher layer signaling (e.g., for CSI), and/or a field in DCI that may indicate a set of parameters, for example, configured by higher layers (e.g., a CSI report setting that may be indicated by an aperiodic CSI field); (vi) a property of, or associated with, the PDSCH transmission, such as a duration, a bandwidth part, a property of the numerology (e.g., a subcarrier spacing, a symbol duration, etc.), a transmission configuration indication (TCI) state (e.g., for HARQ-ACK), a modulation and coding scheme (MCS) table configured or indicated for the control information (e.g., in DCI) associated with the PDSCH transmission; (vii) a property of, or associated with, the PUCCH resource configured for the transmission of the SR (such as a sub-carrier spacing, a duration of PUCCH resource, a logical channel associated to the SR configuration, or a property thereof, such as a priority, and/or a transmission profile explicitly configured as part of the SR configuration); (viii) a property of, or associated to, the grant or the PUSCH transmission (e.g., for uplink data), for example, a property used for determining a logical channel restriction for logical channel prioritization (such as a duration of the PUSCH transmission, a property of the numerology (e.g., sub-carrier spacing, symbol duration), or a property of the carrier); or (ix) a bandwidth part on which an associated PDSCH transmission or PUSCH transmission is transmitted. With respect to (iv), a transmission profile may have precedence based on a priority order that may be configured. For example, a transmission profile may have a precedence based on a configured priority order, if a PDCCH candidate is part of search spaces that are associated with more than one transmission profiles. With respect to (i), a transmission profile associated with a UCI may be determined based on an attribute (e.g., a QoS metric) associated with the logical channel or the logical channel group from which data may be transmitted. With respect to (v), a BLER target value may be configured for a CSI report setting. The BLER target value may implicitly indicate a transmission profile. For example, a lower BLER target value may indicate a transmission profile of higher priority. In an example, the table of CQI reporting may be configured for a CSI report setting.

A transmission profile for DCI or downlink data may be determined, for example, based on one or more of the following: (i) a property of a PDCCH from which DCI may be decoded or from which an assignment for downlink data may be decoded, for example, as disclosed herein for UCI or uplink data (e.g., search space, explicit configuration, etc.); (ii) a modulation and coding scheme (MCS) table indicated for the control information (e.g., in DCI) that is associated with the PDSCH transmission; such indication may be configured by higher layers or may be included in a field of the DCI; (iii) the value of a field in DCI that may be associated with a transmission of downlink data or a RNTI value that may be used to mask a CRC; or (iv) a property of, or associated with, the assignment or the PDSCH transmission (e.g., for downlink data), such as a duration of the PDSCH transmission, and/or a property of the numerology (e.g., a sub-carrier spacing, a symbol duration, etc.)

In an example, a transmission profile may be defined for a physical channel (e.g., PDCCH, PUCCH, PDSCH or PUSCH). A transmission profile may be determined, for example, based on a type of data or control information that may be carried by a physical channel. A transmission profile may be set based on the highest priority level among profiles, for example, when a physical channel transmission includes control information and/or data of different profiles (e.g., UCI multiplexed in PUSCH).

Determination of a profile may indicate a timing characteristic. In an example, a transmission profile may be associated with a timing characteristic. Such timing characteristic may correspond to at least one of the following: (1) scheduling-related delay components, for example, such component may correspond to one of N1 or N2; (2) WTRU processing time, for example, such processing time may correspond to one of N1 or N2; (3) the starting symbol of a transmission; or (4) the duration of a transmission. N1 and/or N2 may be represent a number of OFDM symbols as described herein. In an example, a transmission profile may correspond to a transmission for which one or more such timing characteristics up to a value may be provided. The specific value may represent one aspect of a WTRU's configuration. A transmission profile may be associated with at least one priority level or at least one parameter determining channel access properties for operation in unlicensed band. For example, the at least one parameter may include a maximum contention window size or a defer duration.

Handling of transmission characteristics based on a profile (e.g., a transmission profile) may be provided. Coding aspects, transmission power and/or resource selection or allocation may be determined, for example, based on a transmission profile as described herein.

In an example, a WTRU may determine one or more aspects that may be related to channel coding for a physical channel (e.g., PDCCH, PDSCH, PUCCH or PUSCH) from a transmission profile. Coding aspects that may be determined may include, one or more of the following: (i) a type of code (e.g., polar, LDPC, turbo, repetition); (ii) a code rate; (iii) a length of a cyclic redundancy check (CRC) that may be appended to a set of information bits for error detection; (iv) a mapping between a modulation and coding scheme (MCS) field, and a modulation order and a code rate; or (v) one or more search spaces for one or more aggregation levels for decoding PDCCH.

In an example, a WTRU may be configured with a CRC of 16 bits for PDCCH, for example, when a higher layer configuration for a PDCCH may indicate a first transmission profile. The WTRU may be configured with a CRC of 24 bits, for example, when a configuration may indicate a second transmission profile. Using variable CRC size, for example, may allow a network to use a more reliable PDCCH transmission, when it may be required by the characteristics of data being transmitted.

In an example, a coding rate that may be applied to at least one type of UCI (e.g., HARQ-ACK), may be dependent, for example, on a transmission profile. In an example, UCI of multiple transmission profiles may be multiplexed into the same transmission (e.g., PUCCH). UCI (e.g., each UCI) may be encoded separately, for example, with a profile-dependent coding rate. Such encoding may represent a first encoding stage. Coded bits from the first encoding stage associated with each UCI may be concatenated and subject to a second encoding stage.

Transmission power may be determined based on a transmission profile. In an example, a WTRU may determine and apply a transmission power associated with a transmission. The transmission power may be determined using formula and/or parameters that may be dependent on a transmission profile. In an example, parameters that may be used in a power control formula may be configured (e.g., independently configured) for each transmission profile. In an example, a power control setting may be based on an offset value that may be configured by a transmission profile. In an example, an interpretation of a TPC field (e.g., in terms of the number of dBs for up or down adjustments) may be dependent on a transmission profile. The use of transmission profile to determine transmission power may facilitate the use of an appropriate level of power to achieve a targeted reliability associated with a transmission (e.g., each transmission).

In an example, the power control parameters applied to a transmission of a scheduling request (SR) may depend on an SR configuration. The SR configuration may be mapped to a logical channel that may have triggered the SR.

In an example, the power control parameters applied to a HARQ-ACK transmission may depend on the duration of the corresponding PDSCH transmission. For example, if a PDSCH transmission is below a threshold configured by higher layers, the WTRU may apply a first set of power control parameters. If a PDSCH transmission is above a threshold, the WTRU may apply a second set of power control parameters.

In an example, power control parameters applied to the transmission of HARQ-ACK may depend on an UL bandwidth part (e.g., the active bandwidth part) on which HARQ-ACK is transmitted, or on the DL bandwidth part on which the corresponding PDSCH is transmitted. Each bandwidth part may be configured with a set of power control parameters by higher layers.

In an example, power control parameters applied for the transmission of CSI over PUCCH (or PUSCH) may be dependent on the BLER target value configured for the CSI reporting setting. For example, a WTRU may apply a power offset based on the BLER target value. The BLER target value may be configured by higher layers, for example, for each of the BLER target values. A power offset may be configured, for example, for each CSI reporting setting.

Data or UCI of multiple transmission profiles may be multiplexed in the same transmission. Power control parameters for a common transmission may be determined, for example, based on a profile, for example, a profile with the highest priority level.

In an example, power control parameters may include a specific power control mode (PCM) or a minimum guaranteed power level. For example, the PCM may include PCM1, PCM2, etc.

A resource selection or allocation may be determined, for example, based on a transmission profile. In an example, a resource and/or format that may be used by a transmission may be a function of a transmission profile. For example, in case of PUCCH, a set of resources, and/or format, indicated by ARI may be dependent on a transmission profile. A network may, for example, configure at least one set of resources for a transmission profile, for example, each transmission profile. A set of resources that may be subject to lower interference may be associated with transmission profiles that may be used for more reliable transmissions.

In an example, use of a long or short PUCCH format and/or a number of symbols may be a function of a transmission profile. In an example, a WTRU may be configured to transmit a PUCCH over multiple symbols (e.g., two symbols) for a transmission profile (e.g., a first transmission profile) that may be suitable for ultra-reliable traffic. A WTRU may be configured to transmit a PUCCH over a symbol (e.g., one symbol) for another transmission profile (e.g., a second transmission profile) that may be suitable for other non-ultra-reliable mobile broadband traffic.

In an example, a set of bandwidth parts and numerology (e.g., including one or more of a sub-carrier spacing, length of a cyclic prefix, or number of symbols per slot or mini-slot) may be used for a downlink transmission or an uplink transmission within a carrier may, for example, be dependent on a transmission profile.

In an example, a waveform may be dependent on a transmission profile. For example, a waveform may be an orthogonal frequency-division multiplexing (OFDM) waveform or a single-carrier frequency-division multiple access (SC-FDMA) waveform. In an example, use of frequency hopping may be dependent on a transmission profile.

In an example, with respect to at least one type of UCI (e.g., HARQ-ACK), the UCI may be transmitted over PUCCH or multiplexed with data transmitted over a PUSCH. The selection of whether the UCI is transmitted over a PUCCH or multiplexed with data transmitted over a PUSCH may be dependent on transmission profiles associated with the UCI and the data. In an example, a UCI may be multiplexed with data over PUSCH, for example, when UCI and data may have the same transmission profile or the same priority level associated with the transmission profile. A UCI may be transmitted separately over PUCCH. In an example, at least one type of UCI (e.g., channel state information (CSI)) may be dropped.

In an example, a number or fraction of resource elements that may be used by at least one type of UCI (e.g., when multiplexed with data in PUSCH) may be determined, for example, by one or more factors (e.g., beta parameters). Such factors may be a function of a transmission profile. In an example, for a given type of UCI, a WTRU may be configured with a first set of factors that may be applicable to a first transmission profile and a second set of factors that may be applicable to a second transmission profile. A transmission profile that may be suitable for ultra-reliable traffic may, for example, permit use of a larger proportion of PUSCH resources.

In an example, a WTRU may determine whether UCI diversity is applied. For example, a SR configuration may include a configuration of PUCCH resources applicable to UCI diversity (or a PUCCH diversity resource). For example, when SR is triggered by a logical channel (LCH) mapped to such SR configuration, a WTRU may transmit SR over more than one PUCCH resources (or a PUCCH diversity resource).

Prioritization between transmissions may be provided. In an example, a priority level may be defined or configured for a transmission profile (e.g., each transmission profile). A priority level may be used, for example, to determine whether one or more transmissions may be dropped or pre-empted, scaled down, assigned fewer resources or processed later, e.g., in case there is contention. An occurrence of contention may be beneficial (e.g., from a system perspective) for example, by allowing use of a greater proportion of system resources (e.g., compared to a situation where resources may be reserved).

Prioritization may be provided for power scaling. In an example, a WTRU may scale down at least one transmission, for example, when a configured total maximum power may be exceeded during a time period (e.g., during a subframe, a slot, or a mini-slot). A priority order for scaling may be dependent on a transmission profile (e.g., in addition to other criteria such as UCI or data type). In an example, a transmission profile criterion may take precedence over, or supersede, other criteria. In an example, if a first transmission profile has a higher priority level than a second transmission profile, a PUSCH that may include data to be transmitted in accordance with the first transmission profile may be allocated power before a PUCCH that may include a HARQ-ACK that is to be transmitted in accordance with the second transmission profile. The prioritization based on the use of a transmission profile may apply even when HARQ-ACK may otherwise be prioritized over data.

Prioritization may be provided for dropping a transmission or at least a portion of a transmission. In an example, a WTRU may determine that more than one transmissions may overlap over a subset of resources and that at least a portion of at least one of the transmissions may be dropped or pre-empted, for example, based on transmission profiles associated with the overlapping transmissions. A WTRU may, for example, determine that a transmission with the highest priority (e.g., based on transmission profile) may be transmitted over the resource.

An overlap may result, for example, from scheduling instructions that may be received at various times and with different latency requirements. In an example, a WTRU may receive a downlink assignment that may require transmission of HARQ-ACK over PUCCH in certain symbols of a certain slot. The WTRU may receive a grant (e.g., subsequently receive a grant) for a PUSCH transmission for the same slot. A WTRU may determine that the PUSCH transmission takes precedence over the PUCCH transmission, for example, when the transmission profile associated with the uplink data that may be transmitted over PUSCH has a higher priority level than the transmission profile associated with the HARQ-ACK that may be transmitted over PUCCH. Based on such a determination, a WTRU may use overlapping resources for the PUSCH transmission and may drop the PUCCH transmission. In an example, a WTRU may transmit PUCCH over the overlapped resources. The WTRU may use remaining resources that may be indicated for PUSCH, for example, taking into account a reduced amount of resources in rate matching calculations.

A WTRU may receive a first downlink assignment indicating transmission of HARQ-ACK over PUCCH in a first resource. The WTRU may receive (e.g., subsequently receive) a second downlink assignment indicating transmission of HARQ-ACK over PUCCH in a second resource. The WTRU may transmit HARQ-ACK corresponding to PDSCH (or PDCCH) with transmission profile of higher priority, for example, if the first resource and the second resource overlap or are the same. The WTRU may transmit HARQ-ACK corresponding to PDSCH (or PDCCH) based on, for example, CORESET, search space, and/or RNTI.

In an example, a WTRU may receive a grant for PUSCH over a slot. The WTRU may receive (e.g., subsequently receive) a downlink assignment (or trigger a scheduling request) that may require transmission of a PUCCH over one or more resources of the same slot (e.g., over the last time symbols for a short PUCCH or over one or more time symbols (e.g., most or all of time symbols) available for uplink for a long PUCCH). A WTRU may determine that a PUCCH may be transmitted over an overlapped resource, for example, when the PUCCH includes a UCI associated with a higher transmission profile than data transmitted over a PUSCH. A WTRU may determine that a PUSCH may be dropped or that PUSCH may be transmitted over a non-overlapped resource, e.g., with puncturing applied on an overlapped resource. A course of action may depend on a type of pre-empting transmission (e.g., PUSCH may still be transmitted when pre-empted by a short PUCCH) and/or whether a proportion of a pre-empted resources may be above a threshold.

A WTRU may multiplex HARQ-ACK and CSI into a single PUCCH transmission or PUSCH transmission and determine that a subset of CSI report(s) (e.g., $N_{reported}^{CSI}$) may be selected based on a maximum code rate that may be configured. The priority order for the CSI report(s) may depend on a transmission profile (or the configured BLER target value), such that a CSI report associated with a lower BLER target value may be considered to have a higher priority than a CSI report associated with a higher BLER target value. The priority determined from the BLER target value or transmission profile may have precedence over at least one of other priority criteria used for selection of CSI reports, for example, the type of CSI. For example, this may result in a pre-coding matrix information (PMI) of a CSI report associated with a lower BLER target value having higher overall priority than RI (rank information) of a CSI report associated with a higher BLER target value.

Prioritizing may be provided for DL data processing. In an example, a WTRU may be scheduled to receive DL data with different transmission profiles over at least one PDSCH and may report HARQ-ACK (e.g., at specific times) associated with the DL data. A WTRU may be unable to complete decoding of at least one code block in time for transmission of a corresponding HARQ-ACK. The WTRU may prioritize decoding of DL data of higher priority, for example, according to a transmission profile associated with the DL data.

In an example, a HARQ-ACK may be transmitted before decoding of at least one code block group is completed for a transport block. Depending on the transmission profile associated with data, a WTRU may set HARQ-ACK using one of the following ways. A WTRU may set HARQ-ACK of a not yet decoded code block group to ACK, for example, when decoding may be completed and may set it to NACK for at least one other code block group of the transport block. A WTRU may set HARQ-ACK to an ACK for one or more code block groups except one that may be set to a NACK. This may minimize the amount of resources that may be used by a network for retransmissions, for example, in case some, not yet decoded, code blocks may succeed and not require retransmissions. This example procedure may be selected, for example, for a transmission profile that may have a lower priority.

In an example, a WTRU may set HARQ-ACK of a not yet decoded code block group to NACK. This may minimize latency of a transport block delivery, for example, where retransmitted data may be available sooner, e.g., when the outcome of the decoding may be unsuccessful. This example procedure may be selected, for example, for a transmission profile that may have a higher priority.

Prioritization may be provided for resource sharing. In an example, a WTRU may be configured to multiplex UCI and/or uplink data in accordance with different transmission profiles into a (e.g., the same) PUSCH transmission or a PUCCH transmission. A proportion of resource (e.g., resource elements (REs)) that may be allocated to a UCI or data in accordance with a transmission profile may depend on relative priority levels of the transmission profiles. In an example (e.g., for UCI multiplexing in PUSCH), a first value of a beta parameter for a type of UCI may be applied, for example, when a priority of a transmission profile associated with a UCI is higher than a priority of a transmission profile associated with data. A second value of a beta parameter may be applied, for example, when the transmission profiles have equal priorities. A third value may be applied, for example, when a priority of a transmission profile associate with a UCI is lower than a priority associated with a transmission profile of data.

Payload/MCS selection may be based on prioritization. In an example, a WTRU may be configured to use a first modulation and coding scheme, transport block size, and/or payload for a transmission, for example, when the transmission may not conflict with a transmission of a higher priority according to a transmission profile. A WTRU may be configured to use a second modulation and coding scheme, transport block size or payload for a transmission, for example, when the transmission conflicts with a transmission of a higher priority according to a transmission profile. A conflict may correspond to a situation, for example, when resources of multiple transmissions may overlap or when a configured maximum total transmission power may be exceeded.

State-based differentiated processing may be provided. In an example, a WTRU may apply a set of parameters corresponding to a transmission profile (e.g., based on the transmission profile state). The transmission profile state may be changed by an indication from the network. For example, the transmission profile state may be changed via a MAC control element (MAC CE) or via downlink control information (DCI). The transmission profile state may be changed when an event occurs, such as the expiry of a timer (e.g., a timing advance (TA) timer). The set of parameters corresponding to a transmission profile may include a set of PUCCH resources for HARQ ACK/NACK, a set of parameters used for determining the fraction of resource elements used for UCI in PUSCH, etc.

In an example, a transmission profile and associated parameters may be configured for a bandwidth part. A WTRU configured with multiple bandwidth parts may apply the transmission profile and associated parameters corresponding to an active bandwidth part. The WTRU may receive a DCI or a MAC CE indicating a change of active bandwidth part. The WTRU may (e.g., upon reception of this indication) apply the transmission profile and associated parameters associated with the received (or indicated) active bandwidth part.

In an example, a WTRU may receive a DCI indicating a change of active bandwidth part (for example, where the new active bandwidth part and the existing active bandwidth part may share the same configuration except for at least the transmission profile and associated parameters). For example, the WTRU may be configured with two bandwidth parts with same frequency allocation. When the WTRU receives an indication of active bandwidth part change (e.g., that meets this condition), the WTRU may receive a PDSCH in the same slot as the slot in which the DCI is received based on the parameters indicated in the DCI (e.g., as if there is no change of active bandwidth part). In an example, if a WTRU receives an indication of active bandwidth part where the new active bandwidth part does not have the same frequency allocation as the existing active bandwidth part, the WTRU may apply a gap in the reception of PDSCH (e.g., to allow for retuning and/or to perform other actions (e.g., CSI measurements on the new active bandwidth part)).

Systems, methods, and instrumentalities may be provided for handling of transmission characteristics with an overlap between a plurality of transmissions. A WTRU may determine that an overlap exists in time between a plurality of transmissions, e.g., a first transmission and a second transmission. The WTRU may perform at least one of the following: (1) perform a subset (e.g., one) one of the transmissions; (2) cancel, drop or interrupt (e.g., if already ongoing) one of the transmissions; (3) suspend and/or delay one of the transmissions; (4) perform both transmissions, and/or apply a power scaling function to at least one transmission e.g., if there is no overlap in frequency between the transmissions; or (5) modify at least one property of a first transmission e.g., to convey at least part of the information that may have otherwise been conveyed using a second transmission. For example, a WTRU may modify a property of a demodulation reference signal (DM-RS) for a first PUSCH transmission to indicate a scheduling request (SR). Modification, for example, may include assigning zero power, changing to a second preconfigured resource, changing phase, etc. The WTRU may perform such action in combination with assigning zero power to a second transmission e.g., SR on PUCCH, that may have otherwise overlapped in time.

In other examples of transmissions described herein, a first transmission may include an SR and a second transmission may include a PUSCH (or a PUCCH). An SR associated with high-priority traffic may be multiplexed with PUSCH or PUCCH. A WTRU may indicate and/or transmit uplink control information such as SR associated with a first transmission profile by modifying at least one property of a transmission associated with a second transmission profile, such as a PUSCH transmission or a PUCCH transmission. In an example, the first transmission profile may have higher priority than the second transmission profile. In an example, the duration of the PUSCH transmission or the PUCCH transmission may be longer (e.g., significantly longer) than the periodicity of the scheduling request for the first transmission profile. The length of the PUSCH transmission or the PUCCH transmission may be of nature that waiting for the end of the PUSCH transmission or the PUCCH transmission before transmitting the SR may exceed a latency value (e.g., an acceptable latency value).

The at least one property of the transmission that may be modified may include a property of a reference signal embedded in the transmission, such as a demodulation reference signal (DM-RS). For example, such property may include a relative phase between two time symbols carrying DM-RS. The relative phase may be a first value, for example, if no SR is transmitted. The relative phase may be a second value if a scheduling request is transmitted.

The at least one property of the transmission that may be modified may include a transmission power parameter of at least one time symbol (or a resource element). For example, transmission power of at least one symbol may be reduced as compared to transmission power of the remaining symbols, when SR is transmitted. In an example, the transmission power of the at least one symbol may be reduced to zero and/or the WTRU may not transmit on the at least one symbol. This may allow the network to reliably detect the transmission of SR, and allow successful decoding of the PUSCH.

The at least one time symbol (or resource element) over which a transmission may be modified may be restricted to a subset of the time symbols of the transmission. For example, if the indication is carried by modification of a property of a reference signal, the time symbols may be restricted to time symbols carrying such reference signal. The time symbols affected by the modification may include the time symbols (e.g., all time symbols) carrying the reference signal following triggering of the SR. In an example, if the indication is carried by modification of transmission power of at least one time symbol, the subset may be determined based on a configured periodicity of the scheduling request. The at least one affected time symbol may include a single symbol or the time symbols (e.g., all time symbols) immediately following triggering of SR that may coincide with configured occasions of the scheduling request. In an example, one or more time symbols including reference signals may be excluded from the subset.

In an example, a subset of resource elements (or time symbols) of a PUSCH transmission or a PUCCH transmission may be configured to indicate if SR has been triggered since the beginning of the transmission. A WTRU may be configured with at least one such subset of resource elements occurring regularly (e.g., periodically) in the time domain. Such configuration may depend on a configured periodicity of the SR, or may coincide with configured occasions for the transmission of SR. Over a given subset, a WTRU may transmit a first pre-defined sequence of modulated symbols, for example, if an SR has not been triggered until an offset before the time symbol(s) of the subset. The WTRU may transmit a second pre-defined sequence of modulated symbols, for example, if an SR has been triggered. The pre-defined sequence may over-write (e.g., using puncturing) modulated symbols of the PUSCH or the PUCCH that may have been mapped (e.g., previously mapped) to the subsets of resource elements or the subsets of resource elements may have been excluded at the outset from the set of resource elements to which modulated symbols of the PUSCH or PUCCH transmission are mapped.

Systems, methods, and instrumentalities may be provided for handling of transmission characteristics based on timing may be provided. One or more aspects may be determined as a function of available WTRU processing, e.g., WTRU processing time.

A WTRU may determine that it may apply at least one prioritization or multiplexing solution. The prioritization or multiplexing solution may be a function of one or more timing aspects including, for example, at least one of the following: (1) Timing aspect of when data may be available for transmission, or when data available for transmission may trigger transmission of a BSR and/or transmission of an SR; (2) timing aspect of when a scheduling request (SR) may be triggered; (3) timing aspect of when downlink control information indicating an uplink transmission (e.g., a PUSCH transmission or a PUSCH transmission) may be received; (4) timing aspect of reception of higher layer signaling, for example, at least in case of a configured grant or of another periodic or semi-persistent transmission (e.g., CSI, SRS); (5) timing aspect of when a PUSCH transmission may be scheduled to start (and/or end) according to a configured or dynamic grant; (6) timing aspect of when a PUCCH transmission may start (and/or end), for example, according to a semi-static configuration or an indication from downlink control information; (7) the duration of a PUSCH or PUCCH transmission; or (8) timing aspect of when a transmission may be determined to exist in the future for any other reasons, for example, reception of a paging request, initiation of a procedure such as RRC Connection Re-establishment, etc. In case of (1), for example, a WTRU may perform such determination when new data may become available for transmission for a logical channel (LCH) of a specific priority and/or type, or when data available for transmission may trigger the transmission of a buffer status report (BSR) and/or of a SR. The WTRU may perform such determination for data associated with a mapping restriction (e.g., (LCH to transmission mapping restriction), a profile and/or a LCH/logical channel group (LCG) priority.

A WTRU may perform such determination of applying at least one of prioritization or multiplexing solution for data and/or for a transmission associated with a specific (LCH to transmission) mapping restriction, to a specific profile and/ or to a specific LCH/LCG priority. For example, a WTRU may determine the prioritization or multiplexing solution that may be applied for at least two or more transmissions (e.g., partially overlapping transmissions). The determination may be made based on the difference between the start time of a first transmission and the time when a second transmission is determined to exist, as described herein.

A WTRU may perform a first action 1 (Action 1) or a second action 2 (Action 2), for example, if the WTRU determines that a first event A (Event A) occurs at least x symbol(s) of time before the start of event B (Event B). The event B may be a known event.

One or more timing cases may be provided to indicate that an SR trigger may be a function of suitability of grant. Event A may correspond to a WTRU autonomous trigger associated with the reception of downlink control signaling and/or to an event that may correspond to a higher priority than that of Event B (e.g., based on an applicable transmission profile). The autonomous trigger may be one of the timing aspects as described herein, for example, triggering an SR, when new data may become available for transmission. Event B may correspond to a scheduled event (e.g. an uplink transmission).

In Action 1, a WTRU may determine that a sufficient time is available to act on the scheduled information and/or prioritize one of the two events before the event of lesser priority is started. In Action 2, a WTRU may determine that there is insufficient time to adjust its transmissions and/or prioritize one of the two events before the event of lesser priority is started such that it may instead determine to modify the properties of the corresponding ongoing transmission. The WTRU may be configured with a value of x e.g., by RRC, where x may be a time value in symbols, in a framing unit (e.g., mini-slot, slot, subframe) or in absolute time, e.g., in milliseconds.

In an example, event A may correspond to a SR trigger for data associated with a transmission profile, for example, a transmission profile corresponding to transmission of URLLC data. Event B may correspond to the start of an uplink transmission on PUSCH for data associated with a transmission profile, for example, a transmission profile corresponding to transmission of eMBB data.

Action 1 may correspond to cancellation of an uplink transmission, e.g., the PUSCH transmission corresponding to eMBB data, and the WTRU performing an SR transmission using a resource/method corresponding to URLLC type of data. Action 2 may correspond to cancellation/dropping/zero power setting of one or more specific symbol(s) and/or a DM-RS modification of PUSCH transmission for eMBB, e.g., to indicate SR for URLLC, as described herein.

In an example, one of the transmission may correspond to a first transmission profile or similar e.g., a URLLC service and another may correspond to a second transmission profile, e.g., an eMBB service. In such an example, if a WTRU determines that there is sufficient processing time (e.g., time between two events is less than x), and if the WTRU makes this determination before the start of any one of the transmissions that at least partially overlap, the WTRU may perform at least one of the following for different combinations of signals: (1) the WTRU may prioritize SR(for URLLC), drop PUSCH(for eMBB); (2) the WTRU may prepend and/or puncture PUSCH(for eMBB) with SR(for URLLC), e.g., using a similar concatenation principle as used for UCI on PUSCH for LTE; (3) the WTRU may embed transmission, e.g., drop a part of PUSCH(for eMBB) and replace it with sPUSCH (including BSR(for URLLC)); (4) the WTRU may signal SR using a modification to the DM-RS sequence of the PUSCH(for eMBB); (5) the WTRU may adjust UL PC, e.g., apply power scaling, e.g., if the WTRU is power limited.

In an example, if the WTRU determines that there is not sufficient processing time (e.g., time between two events is less than x), or if the WTRU does not make this determination before the start of any one of the transmissions that at least partially overlap, the WTRU may perform at least one of the following for different combinations of signals: (1) the WTUR may preempt/interrupt or puncture an ongoing PUSCH (for eMBB), and the WTRU may transmit SR(for URLLC) using an associated resource, e.g., on short PUCCH instead, transmit BSR (for URLLC), e.g., short PUSCH (for URLLC) instead, and/or transmit a URLLC TB, e.g., short PUSCH(for URLLC) instead; (2) the WTRU may signal SR using change of DM-RS sequence for the ongoing PUSCH(for eMBB); (3) the WTU may adjust UL PC accordingly (e.g., for DM-RS boosting).

In an example, a WTRU may initiate an additional transmission on the same carrier, for example, if the WTRU is configured with simultaneous PUSCH+PUSCH or PUSCH+PUCCH. The WTRU may send the additional transmission in the same bandwidth part or in a different bandwidth parts, for example, if configured and/or active. The WTRU may perform such transmission using disjoint resources and/or joint resources. Disjoint resources may include separate PUSCH and/or PUCCH transmissions that may be started with other ongoing transmission(s). Joint resources may be used, for example, when URLLC is configured, and/or any grant for other type of traffic (e.g., of lesser priority) may include resources for additional transmissions of SR, BSR.

A WTRU may allocate power using one or more power control functions. A WTRU may consider transmissions that may be transmitted with at least a partial overlap in time, but for which the WTRU may not have made a determination whether or not such transmission will be transmitted. The WTRU may include following factors in making the determination of whether or not to transmit such a transmission: the respective priority in the power allocation function, the method, and/or the resources that may be used, e.g., if performed for maximum power reduction (MPR) setting.

The systems and/or methods described herein may be implemented in a computer program, software, and/or firmware incorporated in a computer-readable medium for execution by a computer and/or processor. Examples of computer-readable media may comprise electronic signals (transmitted over wired and/or wireless connections) and/or computer-readable storage media. Examples of computer-readable storage media may comprise a read only memory (ROM), a random-access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising: a processor configured to:
   receive a first physical downlink control channel (PDCCH) transmission comprising a first downlink control information (DCI), wherein the first DCI indicates a first priority level associated with a scheduled first uplink channel transmission;
   receive a second PDCCH transmission comprising a second DCI, wherein the second DCI indicates a second priority level associated with a scheduled second uplink channel transmission; and
   transmit information associated with one or more of the scheduled first uplink transmission or the scheduled second uplink transmission, wherein the processor is further configured to:
     on a condition that the first priority level associated with the scheduled first uplink channel transmission is equal to the second priority level associated with the scheduled second uplink channel transmission and a first set of resources associated with the scheduled first uplink channel transmission overlaps with a second set of resources associated with the scheduled second uplink channel transmission:
   transmit multiplexed information, wherein the multiplexed information comprises information associated with the scheduled first uplink channel transmission multiplexed with information associated with the scheduled second uplink channel transmission, wherein the multiplexed information is transmitted using a physical uplink control channel transmission or a physical uplink shared channel transmission.

2. The WTRU of claim 1, wherein the processor is further configured to: on a condition that the first priority level associated with the scheduled first uplink channel transmission is higher than the second priority level associated with the scheduled second uplink channel transmission and the first set of resources associated with the scheduled first uplink channel transmission overlaps with the second set of resources associated with the scheduled second uplink channel transmission:
   drop the scheduled second uplink channel transmission, and
   transmit information associated with the scheduled first uplink channel transmission using the physical uplink control channel transmission or the physical uplink shared channel transmission.

3. The WTRU of claim 2, wherein the first DCI or the second DCI is associated with a physical downlink shared channel (PDSCH) transmission.

4. The WTRU of claim 3, wherein the first priority level is associated with a physical downlink shared channel (PDSCH) on which the PDSCH transmission is received, or a physical uplink control channel (PUCCH) on which feedback associated with the PDSCH transmission is sent.

5. The WTRU of claim 1, wherein the first scheduled uplink channel transmission is a first PUCCH transmission, and the second scheduled uplink channel transmission is a second PUCCH transmission.

6. The WTRU of claim 1, wherein the first DCI or the second DCI is associated with a physical uplink shared channel (PUSCH) transmission.

7. The WTRU of claim 1, wherein the scheduled first uplink channel transmission is a physical uplink control channel (PUCCH) transmission, and the scheduled second uplink channel transmission is a physical uplink shared channel (PUSCH) transmission.

8. The WTRU of claim 1, wherein the first priority level or the second priority level is associated with a transmission profile.

9. The WTRU of claim 1, wherein the information associated with the scheduled first uplink channel transmission comprises control information, and the information associated with the scheduled second uplink channel transmission comprises control information or data information.

10. The WTRU of claim 9, wherein the control information comprises hybrid automatic repeat request (HARD) feedback information or uplink control information (UCI), and wherein the data information comprises uplink data.

11. An uplink control information (UCI) transmission method comprising:
   receiving a first physical downlink control channel (PDCCH) transmission comprising a first downlink control information (DCI), wherein the first DCI indicates a first priority level associated with a scheduled first uplink channel transmission;
   receiving a second PDCCH transmission comprising a second DCI, wherein the second DCI indicates a second priority level associated with a scheduled second uplink channel transmission; and
   transmitting information associated with one or more of the scheduled first uplink transmission or the scheduled second uplink transmission, wherein the method further comprises:
     on a condition that the first priority level associated with the scheduled first uplink channel transmission is equal to the second priority level associated with the scheduled second uplink channel transmission and a first set of resources associated with the scheduled first uplink channel transmission overlaps with a second set of resources associated with the scheduled second uplink channel transmission:
       transmitting multiplexed information, wherein the multiplexed information comprises information associated with the scheduled first uplink channel transmission multiplexed with information associated with the scheduled second uplink channel transmission, wherein the multiplexed information is transmitted using a physical uplink control channel transmission or a physical uplink shared channel transmission.

12. The method of claim 11, wherein the method further comprises: on a condition that the first priority level associated with the scheduled first uplink channel transmission is higher than the second priority level associated with the scheduled second uplink channel transmission and the first set of resources associated with the scheduled first uplink channel transmission overlaps with the second set of resources associated with the scheduled second uplink channel transmission:
   dropping the scheduled second uplink channel transmission, and
   transmitting information associated with the scheduled first uplink channel transmission using the physical uplink control channel transmission or the physical uplink shared channel transmission.

13. The method of claim 12, wherein the first DCI or the second DCI is associated with a physical downlink shared channel (PDSCH) transmission.

14. The method of claim 13, wherein the first priority level is associated with a physical downlink shared channel (PDSCH) on which the PDSCH transmission is received, or a physical uplink control channel (PUCCH) on which feedback associated with the PDSCH transmission is sent.

15. The method of claim 11, wherein the first scheduled uplink channel transmission is a first PUCCH transmission, and the second scheduled uplink channel transmission is a second PUCCH transmission.

16. The method of claim 11, wherein the first DCI or the second DCI is associated with a physical uplink shared channel (PUSCH) transmission.

17. The method of claim 11, wherein the scheduled first uplink channel transmission is a PUCCH transmission, and the scheduled second uplink channel transmission is a physical uplink shared channel (PUSCH) transmission.

18. The method of claim 11, wherein the first priority level or the second priority level is associated with a transmission profile.

19. The method of claim 11, wherein the information associated with the scheduled first uplink channel transmission comprises control information, and the information associated with the scheduled second uplink channel transmission comprises control information or data information.

20. The method of claim 19, wherein the control information comprises hybrid automatic repeat request (HARQ) feedback information or uplink control information (UCI), and wherein the data information comprises uplink data.

* * * * *

UNITED STATES PATENT AND TRADEMARK OFFICE
CERTIFICATE OF CORRECTION

PATENT NO. : 11,382,121 B2
APPLICATION NO. : 16/621129
DATED : July 5, 2022
INVENTOR(S) : Paul Marinier et al.

Page 1 of 1

It is certified that error appears in the above-identified patent and that said Letters Patent is hereby corrected as shown below:

In the Claims

Column 35, Line 60, (In Claim 10) cancel the text "hybrid automatic repeat request (HARD)" and insert --hybrid automatic repeat request (HARQ)--.

Signed and Sealed this
Eleventh Day of October, 2022

Katherine Kelly Vidal
*Director of the United States Patent and Trademark Office*